United States Patent [19]

Winzer

[11] Patent Number: 4,540,237

[45] Date of Patent: Sep. 10, 1985

[54] COUPLING ELEMENT FOR COUPLING LIGHT INTO AND OUT OF AN OPTICAL FIBER

[75] Inventor: Gerhard Winzer, Munich, Fed. Rep. of Germany

[73] Assignee: Siemens Aktiengesellschaft, Berlin and Munich, Fed. Rep. of Germany

[21] Appl. No.: 695,753

[22] Filed: Jan. 29, 1985

Related U.S. Application Data

[63] Continuation of Ser. No. 396,729, Jul. 9, 1982, abandoned.

[30] Foreign Application Priority Data

Sep. 30, 1981 [DE] Fed. Rep. of Germany ....... 3138895

[51] Int. Cl.³ ............................................ G02B 5/172
[52] U.S. Cl. .................................................. 350/96.15
[58] Field of Search ........................... 350/96.15, 96.16

[56] References Cited

U.S. PATENT DOCUMENTS

| 4,325,605 | 4/1982 | Winzer et al. | 350/96.15 |
| 4,378,143 | 3/1983 | Winzer | 350/96.15 |

FOREIGN PATENT DOCUMENTS

| 0045437 | 2/1982 | European Pat. Off. | 350/96.15 |
| 3012184 | 10/1981 | Fed. Rep. of Germany | |
| 52-64939 | 5/1977 | Japan | 350/96.15 |
| 53-29740 | 3/1978 | Japan | 350/96.15 |

*Primary Examiner*—John Lee
*Attorney, Agent, or Firm*—Hill, Van Santen, Steadman & Simpson

[57] ABSTRACT

A coupling element is composed of a thick core fiber having an end formed by a first and second end surface with the first end surface extending substantially perpendicular to the axis of the fiber and the second end surface, which has a highly reflective mirror layer being inclined to the first end surface and to the axis. A second fiber, which is thinner than the first fiber, is coupled by a butt-joint to the first end surface and a third fiber which is also a thick core fiber branches off obliquely from the side of the first fiber adjacent the end.

11 Claims, 1 Drawing Figure

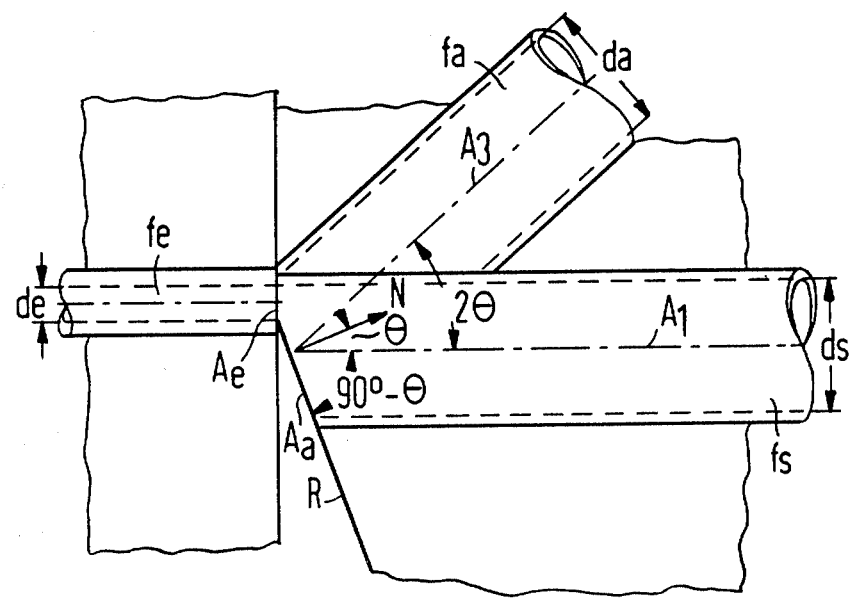

COUPLING ELEMENT FOR COUPLING LIGHT INTO AND OUT OF AN OPTICAL FIBER

This is a continuation of application Ser. No. 396,729, filed July 9, 1982, abandoned.

BACKGROUND OF THE INVENTION

The present invention is directed to a coupling element for coupling light into and out of an optical fiber which has an end formed by a pair of end surfaces that extend at an angle to one another with one of the pair of end surfaces being essentially perpendicular to the axis of the optical fiber and the other end surface of the pair which end surface is inclined to the axis being provided with a reflective layer.

In the system fibers for an optical data bus which bus may be assumed to be realized as a star bus with a reflective mixer, light is to be coupled into the system fiber from the transmitter of the subscribers with as little loss as possible. In addition, light is to be coupled out of the system fiber to the receivers of the subscriber with a high degree of efficiency.

SUMMARY OF THE INVENTION

It is an object of the present invention to provide a coupling element of a specific type in which light can be coupled into an optical fiber with as little light loss as possible and light can also be coupled out of the optical fiber with a high degree of efficiency. To accomplish these objects, the present invention is directed to a coupling element for coupling light power into and out of a first optical fiber, said coupling element comprising a first optical fiber with an end having a first end surface and a second end surface inclined at an angle relative to one another, the first end surface extends essentially perpendicular to the axis of the first optical fiber and the second end surface is inclined relative to the axis and has a reflective layer, a second optical fiber is coupled to the first end surface of the first optical fiber, and a third optical fiber branches laterally from the first optical fiber adjacent the end, the diameter of the light conducting area of the second optical fiber is smaller than the diameter of the light conducting area of each of the first fiber and third fiber.

Preferably, the axis of the third fiber forms an angle $2\theta$ with the axis of the first fiber which is twice as great as the angle $\theta$ which is formed by a surface normal of the second end surface with the axis of the first fiber. The second end surface forms an angle with the axis of the first fiber which angle is in a range of between 45° and the arc sine ($A_N/n_0$), wherein $A_N$ denotes the numerical aperture of the first fiber and $n_0$ is the index of refraction of the light conducting area of the first fiber. The numerical aperture of the third fiber is equal to or greater than the numerical aperture of the first fiber and the numerical aperture of the second fiber is equal to or less than the numerical aperture of the first fiber. The first, second and third fibers may all be fibers with a stepped index of refraction. Also, while the first and third fibers are fibers having a stepped index of refraction, the second fiber may be a fiber with a gradient index of refraction. Preferably, the first and third fibers are fibers which have a thick core, which has a diameter for the light conducting portion of approximately 200 μm while the core diameter of the light conducting portion of the second fiber is approximately 50 μm and preferably all of the fibers have a numerical aperture of 0.3

BRIEF DESCRIPTION OF THE DRAWINGS

The FIGURE shows an embodiment of the coupling element in accordance with the present invention.

DESCRIPTION OF THE PREFERRED EMBODIMENTS

The principles of the present invention are particularly useful in a coupling element illustrated in the FIGURE. The coupling element comprises a first optical fiber $f_s$, a second optical fiber $f_e$, a third optical fiber $f_a$ and means for supporting the fibers in the desired relationship.

The first optical fiber $f_s$ is a system fiber that has an end formed by a first end surface $A_e$ and a second end surface $A_a$ which surfaces are illustrated as extending at an angle relative to each other. The first end surface $A_e$ is perpendicular to the axis $A_1$ of the first fiber $f_s$, however, the second end surface $A_a$ is inclined at an angle of $90°-\theta$ relative to the axis $A_1$ which angle lies in a range between 45° and the arc sine ($A_N/n_0$), wherein $A_N$ is the numerical aperture of the first fiber $f_s$. As illustrated, the second end surface $A_a$ is covered with a reflective layer R.

The second optical fiber $f_e$, which serves as an incoupling fiber for coupling light into the system fiber $f_s$, is coupled with a butt-joint to the first end surface $A_e$ of the first optical fiber, which end surface, as pointed out hereinabove, extends perpendicular to the axis $A_1$. As illustrated, the second fiber $f_e$ has a second axis which extends parallel to the axis $A_1$ but is offset therefrom. The light conducting area or core of the second fiber $f_e$ has a diameter $d_e$, which is smaller than a diameter $d_a$ of the light conducting area or core of the third optical fiber $f_a$, which extends or branches laterally off from the first optical fiber adjacent the end. The third optical fiber $f_a$ serves as an out-coupling fiber for coupling light out of the first optical fiber $f_s$. A reception diode (not illustrated) may be coupled to the far or opposite end of the output coupling fiber formed by the third fiber $f_a$.

The fibers $f_s$ and $f_a$ should be fibers with a stepped index of refraction. However, the second fiber $f_e$ may either be of the same type or can also be a fiber that has a gradient index of refraction. The numerical aperture of the first fiber $f_s$ and the third fiber $f_a$ should be identical or the numerical aperture of the third fiber $f_a$ should be greater than the numerical aperture of the first fiber $f_s$. The numerical aperture of the second fiber $f_e$ and of the first fiber $f_s$ should be equal or the numerical aperture of the second fiber $f_e$ should be smaller than the numerical aperture of the first fiber $f_s$.

In a practical case, for example, the numerical aperture for each of the three fibers $f_s$, $f_e$, $f_a$ is 0.3. The diameter $d_s$ of the core of the first fiber $f_s$ and the diameter $d_a$ of the core of the third fiber $f_a$ can be 200 μm and the diameter $d_e$ of the second light conducting area or core of the second fiber $f_e$ can be selected at 50 μm.

As illustrated, the support means for the various fibers of the coupling element is formed by substrates having covers or by a plurality of interconnected block members. The coupling element can be manufactured in accordance with known methods or can be manufactured according to the teachings of copending U.S. application Ser. No. 246,100, filed Mar. 20, 1981, which was based on German OS No. 3,012,184 and whose disclosure is incorporated herein by reference thereto.

The asymmetrical coupling element is particularly suited for data buses with reflex mixers.

The axis $A_3$ of the third fiber $f_a$ is inclined relative to the axis $A_1$ of the first fiber $f_s$ at an angle $2\theta$ which is twice as great as the angle $\theta$ which is formed by a surface normal N of the second surface $A_a$ to the optical axis $A_1$ of the first fiber $f_s$. The third fiber $f_a$ abuts laterally obtuse to the first fiber $f_s$. The mirror or reflective layer R on the second end surface $A_a$ is inclined relative to the axis $A_1$ and should be highly reflective.

Although various minor modifications may be suggested by those versed in the art, it should be understood that I wish to embody within the scope of the patent granted hereon, all such modifications as reasonably and properly come within the scope of my contribution to the art.

I claim:

1. A coupling element for coupling light into and out of a first optical fiber, said element comprising a first optical fiber with a first axis and having an end being formed by a first end surface and a second end surface inclined at an angle relative to one another, said first end surface extending essentially perpendicular to the first axis of said first optical fiber and said second end surface being inclined relative to said first axis and having a reflective layer, a second optical fiber having a second axis and being coupled to said first end surface with the second axis being parallel to the first axis and offset therefrom, and a third optical fiber branching laterally from the first optical fiber adjacent said end, the diameter of the light conducting area of the second optical fiber being smaller than the diameter of the light conducting area of each of the first optical fiber and the third optical fiber.

2. A coupling element according to claim 1, wherein the axis of the third optical fiber describes an angle $2\theta$ with the first axis of the first optical fiber which angle $2\theta$ is twice as great as an angle $\theta$ formed by a surface normal of the second end surface and the first axis of the first fiber.

3. A coupling element according to claim 1, wherein the second end surface forms an angle with the first axis of the first fiber having a value in a range between 45° and the arc sine $(A_N/n_0)$, wherein $A_N$ is the numerical aperture of the first fiber and $n_0$ is the index of refraction of the light conducting area of said first fiber.

4. A coupling element according to claim 1, wherein the numerical aperture of the third fiber is equal to or greater than the numerical aperture of the first fiber.

5. A coupling element according to claim 1, wherein the numerical aperture of the second fiber is equal to or smaller than the numerical aperture of the first fiber.

6. A coupling element according to claim 1, wherein the first and third fibers are fibers having a stepped index of refraction.

7. A coupling element according to claim 6, wherein the second fiber is a fiber with a stepped index of refraction.

8. A coupling element according to claim 6, wherein the second fiber is a fiber having a gradient index of refraction.

9. A coupling element according to claim 1, wherein the first and third fibers are thick core fibers.

10. A coupling element according to claim 9, wherein all of said fibers have a numerical aperture of 0.3, wherein said first and third fibers have core diameters of the light conducting area of approximately 200 $\mu$m, and wherein the second fiber has a core diameter of the light conducting area of approximately 50 $\mu$m.

11. A coupling element for coupling light into and out of a first optical fiber, said element comprising a first optical fiber having an end being formed by a first end surface and a second end surface inclined at an angle relative to one another, said first end surface extending essentially perpendicular to the axis of said first optical fiber and said second end surface being inclined relative to said axis and having a reflective layer; a second optical fiber being coupled to said first end surface; and a third optical fiber branching laterally from the first optical fiber adjacent said end, the diameter of the light conducting area of the second optical fiber being smaller than the diameter of the light conducting area of each of the first optical fiber and the third optical fiber, and the light conducting area of the second optical fiber being approximately the same as the light conducting area of the first end surface.

* * * * *